United States Patent [19]
Anders

[11] 4,332,541
[45] Jun. 1, 1982

[54] FILTERING ARRANGEMENT FOR THERMOPLASTICS MATERIALS

[75] Inventor: Dietmar Anders, Hanover, Fed. Rep. of Germany

[73] Assignee: Hermann Berstorff Maschinenbau GmbH, Hanover, Fed. Rep. of Germany

[21] Appl. No.: 208,640

[22] Filed: Nov. 20, 1980

[30] Foreign Application Priority Data

Nov. 27, 1979 [DE] Fed. Rep. of Germany ....... 2947685

[51] Int. Cl.$^3$ .............................................. B29B 5/02
[52] U.S. Cl. ...................................... 425/197; 210/91; 210/409; 210/411; 210/791; 210/DIG. 15; 425/199; 425/376 R; 425/376 B; 425/378 R
[58] Field of Search ........... 425/197, 198, 199, 376 R, 425/376 B, 203, 378 R; 210/791, DIG. 15, 91, 409, 411

[56] References Cited

U.S. PATENT DOCUMENTS

| | | | |
|---|---|---|---|
| 2,736,058 | 2/1956 | Dellheim | 425/203 |
| 3,146,494 | 9/1964 | Sponaugle | 425/199 |
| 3,455,357 | 7/1969 | Zink | 425/197 |
| 3,480,706 | 11/1969 | Carpenter et al. | 425/199 |
| 3,804,381 | 4/1974 | Bielfeldt et al. | 425/203 |
| 3,817,377 | 6/1974 | Piggott | 425/197 |
| 4,070,138 | 1/1978 | Stanwood | 425/154 |

FOREIGN PATENT DOCUMENTS 2407633 9/1974 Fed. Rep. of Germany .

*Primary Examiner*—Jeffery R. Thurlow
*Attorney, Agent, or Firm*—Schwartz, Jeffery, Schwaab, Mack, Blumenthal & Koch

[57] ABSTRACT

A filtering arrangement of thermoplastics extruding apparatus has a rotatable cylindrical screen unit through which material flows radially inwards and is discharged axially and an outlet aperture for impurities which are washed from the screening unit by reverse flow, i.e. radially outward flow, of part of the filtered material. The outlet aperture for the impurities is variable in cross-section by moving an arcuate segment about the axis of the cylinder to control the extent of reverse flow washing.

6 Claims, 2 Drawing Figures ical and more particularly to filtering arrangements used with screw extruders, to filter foreign bodies out of molten thermoplastics moulding materials and to retain particles of said materials which are not adequately broken down. Such filters are indispensable when reworking plastics waste, as a means of separating residues combined with the plastics waste, e.g. aluminum residues, from the plastics melt.

The residues are deposited in a screen unit of the filtering arrangement, and it has therefore been proposed to equip such filtering arrangements with means for reverse flow washing of the screen unit. This type of automatic washing of the stack of screens is claimed to keep the filter in operation longer, without undue rise in pressure resulting from clogging of the screen unit.

Figure 2:
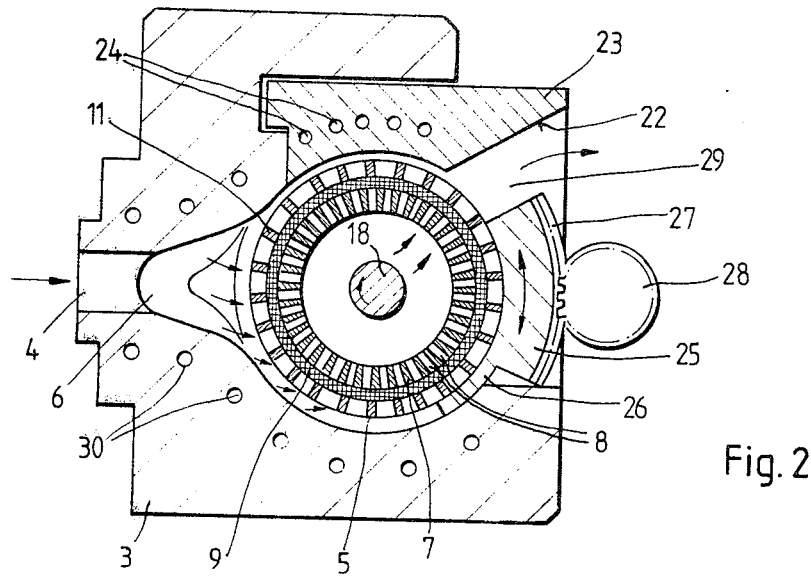
Figure 1:
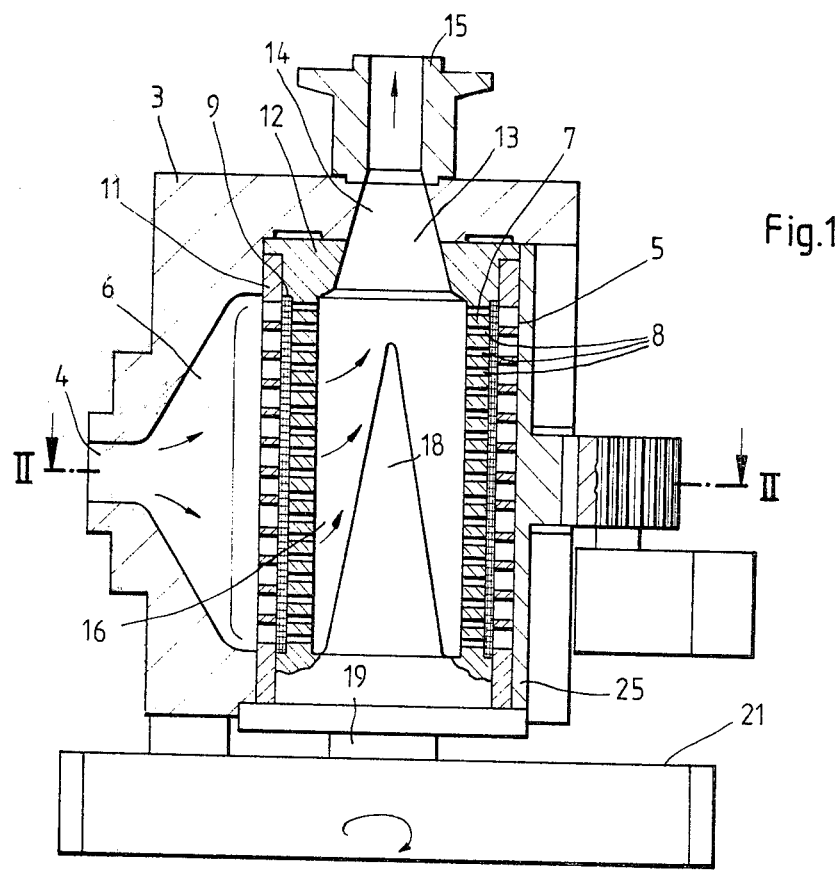

FIGS. 1 and 2 of published German Patent No. 2 407 663 show a filtering arrangement constructed on the reverse flow washing principle with a cylindrical screen unit onto the outer periphery of which material to be filtered is guided, through distribution channels provided in a surrounding housing cylinder. The filtered material which has passed through the screen unit flows away in an axial direction. The screen unit is turned in stages, so that each row of holes in a screen carrier accommodating a stack of screens comes successively into registry with reverse flow channels in the housing cylinder. With the aid of a rotatable control valve each individual hole in the screen carrier is successively connected to atmosphere, so that each hole is washed through by reverse flow of a diverted part of the stream of filtered material from the outlet channel. Impurities which collect on the batch of screens and in the holes in a perforated cylinder holding the batch on the screen carrier are thus discharged into an outer chamber.

This filtering arrangement includes expensive technical equipment and only allows for a slight reverse flow action. When there is a high content of foreign bodies in the molten material, the arrangement is not efficient enough and is also very prone to trouble, since the reverse flow channels in the housing cylinder become obstructed by the foreign bodies.

The invention has among its objects to provide a filtering arrangement in apparatus for extruding thermoplastics materials, which filtering arrangement is of simple construction and wherein reverse flow washing of the screen unit for the purpose of removing impurities operates without any trouble, even when there is a high content of foreign bodies such as in re-worked moulding material.

According to the invention, there is provided, in apparatus for extruding thermoplastic moulding materials and including a screw extruder and a moulding tool, a filtering arrangement disposed between said screw extruder and said moulding tool, said filtering arrangement comprising a casing; a cylindrical screen unit mounted in said casing, said casing surrounding said cylindrical screening unit and being formed to present an outlet aperture through which impurities deposited on said cylindrical screening unit can be ejected from said casing by reverse flow of material through said cylindrical screening unit, said outlet aperture extending over the whole length of said cylindrical screening unit; drive means continuously to rotate said cylindrical screening unit and adjustment means to vary the effective width of said outlet aperture.

The outlet aperture for the impurities washed out of the cylindrical screen unit by the reverse flow washing thus connects one or more rows of holes in the screen unit to an outer chamber. By changing the width of the outlet aperture each row of holes in the screen unit is connected to the outer chamber for a shorter or longer time, and thus has the counter-flow of material washing through it for a time dependent on the width of the outlet aperture. This adjustable, variable duration for the washing of the rows of holes in the screen unit during one revolution of the screen unit makes it possible to adapt the filtering arrangement to moulding materials with a different content of foreign bodies, without any constructional alteration and without exchanging any components.

Advantageously said adjustment means includes an arcuate slide segment located in said outlet aperture, pivotable about the axis of said cylindrical screening unit and so disposed as to be slidable over the outer surface of said cylindrical screening unit; an insert member is provided in said outlet aperture and extends parallel to the axis of said cylindrical screening unit; and said outlet aperture is defined by and between said arcuate slide segment and said insert member. If the reverse flow washing time is to be shortened, the outlet aperture is made smaller simply by pivoting the slide segment towards the insert member. To enlarge the outlet aperture the segment is pivoted away from the insert member.

Preferably the slide segment has an outer periphery with teeth thereon and said teeth are engaged by a drive pinion of an adjusting drive of said adjustment means.

Said insert member can be formed to present bores for the passage of a coolant fluid to cool said insert member. Cooling of the insert member can cause any molten material which passes into the gap between the insert member and the screen unit to set. A self-sealing action for the filtering arrangement is thus obtained by this simple method.

The invention is diagrammatically illustrated by way of example with reference to the accompanying drawing, in which:

FIG. 1 is a sectional plan view of a filtering arrangement according to the invention with continuous reverse flow washing of a screen unit; and FIG. 2 is a cross-section taken on line II—II of FIG. 1.

Referring to the drawing, a filter casing 3 is joined by a flange to one end of a screw extruder (not shown) and has an inlet channel 4 aligned with the extrusion orifice of the extruder. A cylindrical screening unit 5 is arranged rotatably in the filter casing 3 with its axis at right angles to the inlet channel 4. The inlet channel 4 extends into a fishtail-shaped distribution chamber 6 which extends for the full axial length of the screening range of the screening unit 5.

The screening unit 5 comprises a screen carrier 7 with radial flow holes 8 therein, a cylindrical stack of screens 9, located on the carrier 7, and an outer, perforated cylinder 11 which covers the stack 9. The perforated cylinder 11 and stack of screens 9 are fixed to the screen carrier 7.

At one end 12 the screen carrier 7 has a central output aperture 13 which is connected to a moulding tool 15 by a bore 14 in the casing 3. The cylindrical screening unit 5 encloses an output channel 16 for the filtered material, and a direction-changing member 18 is fixed to the end of the carrier 7 remote from the output aperture 13. The direction-changing member 18 has a conical shape with the tip of the cone pointing in the direction in which the flow of material is discharged. The screening unit 5 can be turned by a gear drive 21 by means of a drive journal 19 mounted on the screen carrier 7.

At the side of the screening unit 5 generally opposite the inlet channel 4 there is an outlet aperture 22 in the casing 3, extending over the length of the screening unit 5. One longitudinal side of the outlet aperture 22 is formed by a casing insert 23 fixed in the casing 3. The temperature of the insert 23 can be controlled by means of coolant passed through bores 24 therein. An arcuate slide segment 25 is disposed in the outlet aperture 22 and slides over the perforated cylinder 11. A thin extension 26 of the arcuate segment 25 is disposed displaceably between the outer surface of the cylinder 11 and the filter casing 3, thereby sealing off the distribution chamber 6 from the outlet aperture 22 in the casing 3. The arcuate segment 25 has teeth 27 on its outer periphery, and these are engaged by a drive pinion 28 of an adjusting drive. The casing insert 23 and the arcuate segment 25 thus define between them a reverse flow channel 29 of the outlet aperture 22 which is of variable width.

The temperature of the filter casing 3 can be controlled by means of coolant passed through bores 30 in it.

The filter arrangement described above operates as follows:

Material plasticised and conveyed by the screw extruder enters the casing 3 through the inlet channel 4, and passes through the perforated cylinder 11, the stack of screens 9 and the flow holes 8 in the screen carrier 7 in its passage to the output channel 16. Any impurities of foreign bodies on the surface of the stack of screens 9 are left behind in the holes in the cylinder 11. The gear drive 21 continuously turns the rotatable screening unit 5, so that each row of holes passes the reverse flow channel 29 of the outlet aperture 22 in turn. During this movement past the channel 29 the flow holes 8 of the screen carrier 7 which then coincide with the channel 29 have a partial stream of material from the output channel 16 flowing through them in a direction opposite the normal direction of flow. In the course of this action impurities and foreign bodies from the stack of screens 9 and the holes in the cylinder 11 are washed out and discharged into an outer chamber.

If the pressure in the inlet channel 4 is found to rise despite the washing of the rotatable screening unit 5, this must be taken as an indication that the washing time is too short. By actuating the adjusting drive the slide segment 25 can be pivoted by the pinion 28 away from the casing insert 23 thereby widening the reverse flow washing channel 29. The flow holes 8 moving past the channel 29 are thus exposed to washing for a longer time. This again ensures that the extruded material constantly passes through a cleaned screening unit 5 and does not experience any troublesome rises in pressure.

What is claimed is:

1. Apparatus for extruding and filtering thermoplastic moulding materials, comprising:
    (a) generally cylindrical casing means defining an inlet opening, an axially extending and radially projecting outlet aperture, and a central output opening;
    (b) a cylindrical screen unit mounted in said casing means, said screen unit being substantially equal in axial length to said outlet aperture;
    (c) drive means for continuously rotating said screen unit, and
    (d) adjustment means for varying the effective width of said outlet aperture, whereby impurities adhering to said screen unit are ejected from said casing means by reverse flow of material through said rotating cylindrical screen unit during each revolution thereof, and outwardly through said outlet aperture.

2. The apparatus of claim 1, wherein said cylindrical screen unit comprises a generally cylindrical screen carrier formed with radial flow holes, a plurality of cylindrical screens positioned on the outer surface of said carrier, and an outer perforated cylinder disposed over said screens, said perforated cylinder and said screens being fixed to said carrier for rotation therewith, the plasticized material normally passing through said perforated cylinder, said screens and said radial flow holes of said screen carrier to said central output opening, material adhering to said outer perforated cylinder being ejected therefrom through said outlet aperture by reverse flow of material flowing to said central output aperture.

3. The apparatus of claims 1 or 2, wherein said adjustment means includes an arcuate slide segment located in said outlet aperture and pivotable about the axis of said cylindrical screen unit, said segment being so disposed as to be slidable over the outer surface of said cylindrical screen unit, and wherein said casing means includes an insert member positioned in said outlet aperture and extending parallel to the axis of said cylindrical screen unit, said outlet aperture being defined by and between said arcuate slide segment and said insert member.

4. The apparatus of claim 3, wherein said arcuate slide segment includes an extension disposed between said casing means and said cylindrical screen unit thereby sealing off material entering said inlet opening from direct access to said outlet aperture.

5. The apparatus of claim 3, wherein said arcuate slide segment has an outer periphery with teeth thereon and said teeth are engaged by a drive pinion.

6. The apparatus of claim 3, wherein said insert member is formed with bores for the passage of a coolant fluid to cool said insert member.

* * * * *